United States Patent [19]

Heinz et al.

[11] 4,357,640

[45] Nov. 2, 1982

[54] THIN FILM MAGNETIC TRANSDUCER

[75] Inventors: John E. Heinz, Plymouth; M. Grant Albrecht, Minneapolis, both of Minn.

[73] Assignee: Nortronics Company, Inc., Minneapolis, Minn.

[21] Appl. No.: 200,385

[22] Filed: Oct. 24, 1980

[51] Int. Cl.$^3$ .................... G11B 5/20; G11B 5/22
[52] U.S. Cl. .................... 360/119; 360/125; 360/123
[58] Field of Search .......... 360/125, 126, 127, 119, 360/123

[56] References Cited

U.S. PATENT DOCUMENTS 3,986,210  10/1976  Sugaya et al. ............... 360/123

*Primary Examiner*—Robert S. Tupper

*Attorney, Agent, or Firm*—Merchant, Gould, Smith, Edell, Welter & Schmidt

[57] ABSTRACT

A thin film magnetic transducer having a pair of planar core pieces with front and rear legs and a coil formed around the rear legs. The coil is preferably formed by deposition where turns of the coil have a bottom pieces, riser portions and top pieces which are interconnected to form the coil. In the preferred embodiment, the transducer track width is terminated by means of termination portions which extend into the transducer gap. These portions are preferably defined to create a more uniform flux density at the edges of the track width. In addition, the flux density across the track width is preferably made more uniform by including a curve portion along the rear edge of the front legs. This curve portion may also follow an exponential formula to achieve this uniform density.

11 Claims, 5 Drawing Figures

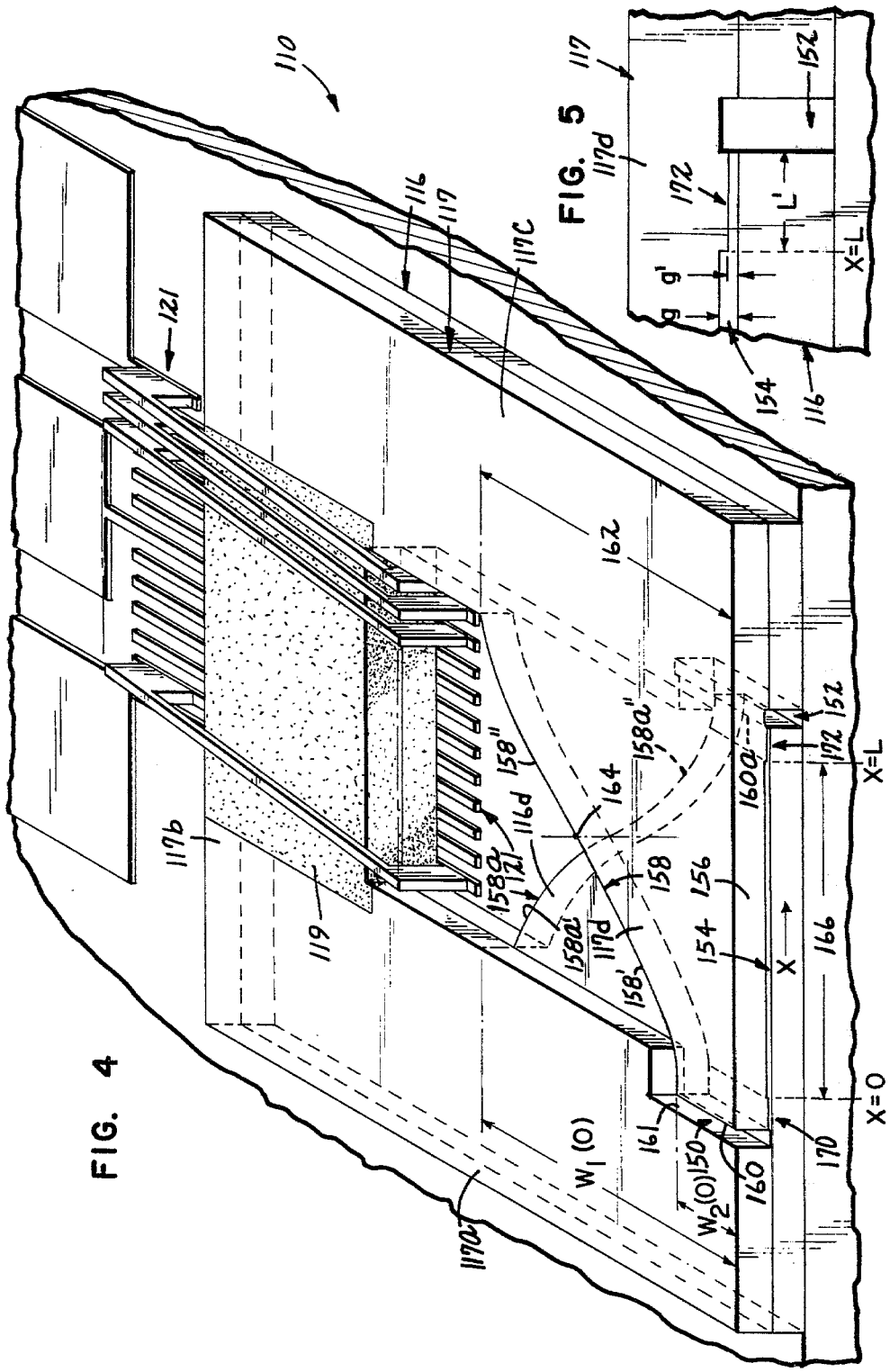

THIN FILM MAGNETIC TRANSDUCER

TECHNICAL FIELD

This invention relates to the construction of thin film magnetic transducers, and more particularly relates to a thin film inductive head having a deposited thin film coil mounted around a back leg of the core structure isolated from the gap, in which the track width can be made nearly equal to the track pitch regardless of the number of turns, and which can be fabricated with a minimal number of processing steps.

BACKGROUND OF THE INVENTION

Vertical inductive thin film heads have evolved considerably during the last decade, and are now a well proven concept with many established advantages over conventional head designs. Two distinct structures have evolved, upon which most current designs are based. The two structures differ in the way the thin film electrical turns are fabricated around a yoke structure. In one arrangement, the electrical coil is deposited in a spiral pattern, and in the other arrangement the coil is formed in the shape of a helix. Both prior art techniques severely limit the number of turns which can be fabricated through the yoke.

A typical prior art thin film magnetic head assembly employing the spiral technique is disclosed in the Church et al U.S. Pat. No. 4,219,854 issued Aug. 26, 1980. The spiral structure is essentially a planar configuration with the spiral coil being deposited on a single level. The pole pieces are spaced above and below the thin film coil and because of this close proximity of the pole pieces, the magnetic efficiency is inherently low. The magnetic efficiency is further degraded in a manner directly proportional to the number of turns through the yoke structure because the magnetic efficiency varies as l/L where l is the distance between the pole pieces and L is the distance between the back leg of the core arrangement and the gap. Another problem with the spiral technique is that the turns extend beyond the track width. Increasing the number of turns causes lateral spread of the head assembly, which is a limiting factor in head per track devices where high track density is desired. However, an advantage of spiral heads is that fabrication of the thin film coil is accomplished with relative ease.

The helix is a multi-layer structure. The conductor is deposited sequentially with appropriate insulation. A typical prior art helical coil arrangement is disclosed in the Gibson U.S. Pat. No. 4,143,458 issued Mar. 13, 1979. The helical arrangement offers some improved magnetic efficiency over the spiral arrangement but only at the expense of severe processing problems encountered during deposition and definition of the multiple layers.

These presently known thin film head designs do not permit both high magnetic efficiency and ease of fabrication. Although the spiral head is easy to fabricate, it it limited in the number of turns which can be accomodated if close track spacing is desired. The resultant device will have fewer turns and thus the efficiency will be low. In the present invention a large number of turns are easily manufactured and do not effect the magnetic efficiency or increase difficulties in processing. A head using the helical coil arrangement has better magnetic efficiency and is more narrow so as to permit closer spacing, but such heads are difficult to fabricate.

SUMMARY OF THE INVENTION

In the present invention, first and second generally U-shaped core pieces are deposited on a substrate with the core pieces being superimposed and oppositely oriented, with a thin film gap spacer deposited between the superimposed front legs. A thin film conductive coil, also constructed by deposition techniques, is positioned around the superimposed rear legs, between the spaced side legs of the transducer. The various elements, including suitable layers of insulation, are sequentially deposited. A minimal number of processing steps are required insuring ease of fabrication. The magnetic yoke structure in the present invention is quite different from the prior art structures and the resulting magnetic efficiency is high. Essentially, the small l dimension is now in the plane of the substrate, rather than normal to it, thus resulting in a desirable large value of l/L. Further, the electrical turns are fabricated well away from the gap and the number of turns does not dictate the value of l/L. For any given track pitch, this isolated coil arrangement also lends itself to the fabrication of a greater number of turns. The resulting heads can also be more closely spaced where high track density is desired because the coil is no wider than the pole structure. In a preferred embodiment of the invention disclosed herein, improved uniformity of the magnetic field strength across the track width is accomplished by utilizing special shaping of the poles. As a result of the present invention, a unique thin film magnetic recording head construction is provided which permits high performance in both disc and tape applications involving single or multiple heads, and which is both simple and inexpensive to manufacture.

BRIEF DESCRIPTION OF THE DRAWINGS

FIG. 4 is an enlarged fragmentary view of a head construction, showing in perspective a preferred embodiment of the present invention; and FIG. 5 is an enlarged plan view of a portion of the tape engaging face of the transducer of FIG. 4.

DETAILED DESCRIPTION OF THE EMBODIMENTS

Figure 1:
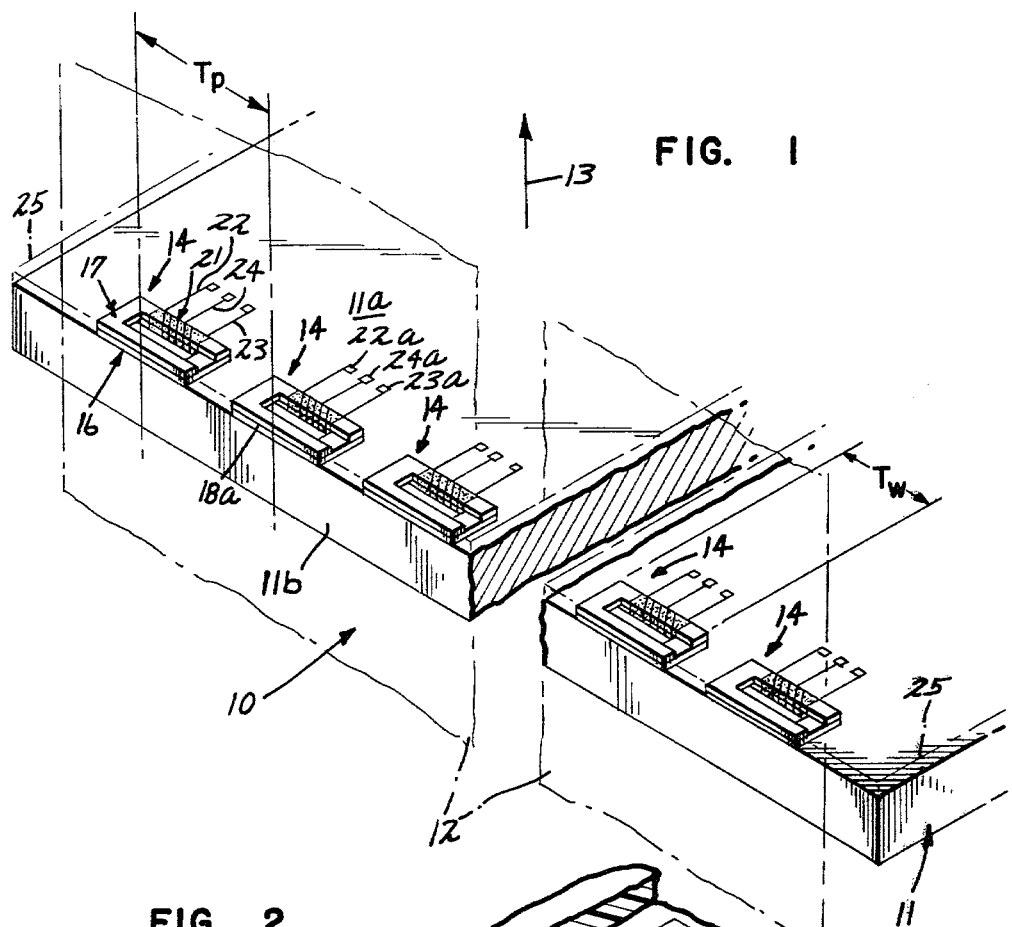
FIG. 1 is an enlarged view in perspective, portions thereof being broken away, of a multiple channel thin film write/read head utilizing a plurality of thin film transducers constructed according to the present invention.

Referring now to the drawings, FIG. 1 discloses a thin film tape head 10 which includes a nonmagnetic substrate 11 having an upper surface 11a and an adjacent edge 11b perpendicular thereto adapted to face a magnetic recording medium, in this case a magnetic tape 12 shown in phantom which moves in the direction of arrow 13 perpendicular to the plane of surface 11a. Mounted on the upper surface 11a at possibly equally spaced intervals along edge 11b are a plurality of identically constructed thin film magnetic transducers 14. The transducers 14 each have a front edge positioned flush with edge 11b so as to contact the face of the tape 12 as it moves past the head 10. In this embodiment, the track width ($T_w$) is approximately 10 mils (254 micrometers), track pitch (distance between center of track width of two heads) 25 mills (635 micrometers) and the distance between heads 10 is about 1 mil (25.4 micrometers).

Figure 2:
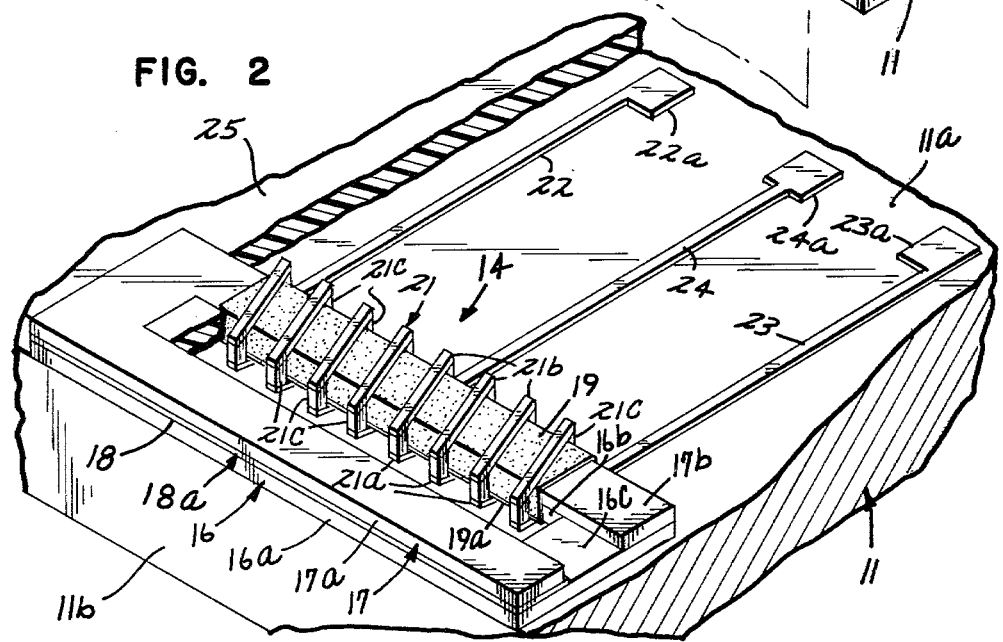
FIG. 2 is an enlarged fragmentary view of a single thin film transducer, portions thereof being broken away.
Figure 3:
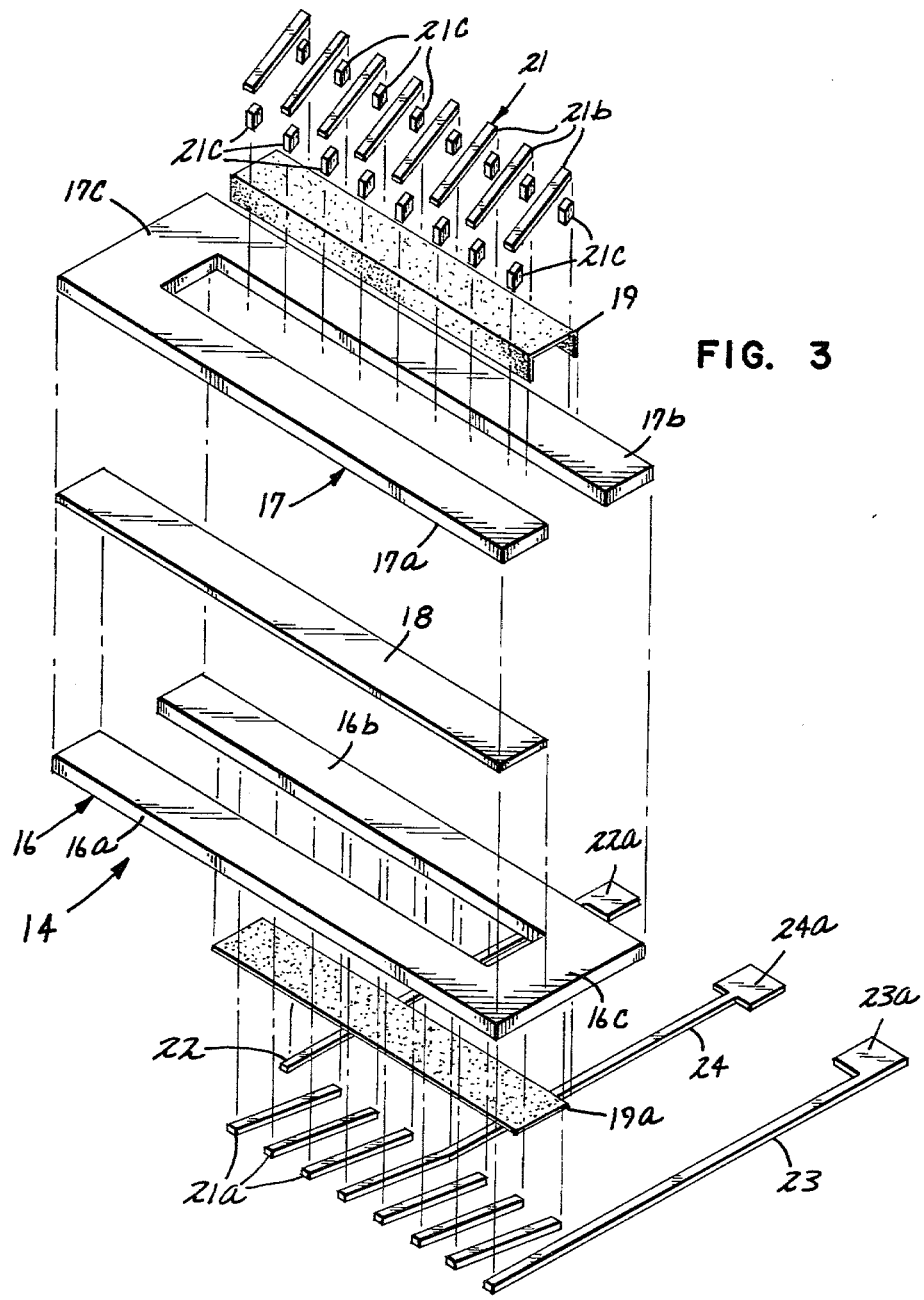
FIG. 3 is an exploded view in perspective of the transducer of FIG. 2.

The construction of the transducers 14 is shown in FIGS. 2 and 3. Each transducer includes first and second core pieces 16 and 17, each comprising a magnetic thin film having a generally U-shape with spaced front and rear parallel legs 16a, 16b, and 17a, 17b and a connecting side leg 16c, 17c. The two core pieces 16, 17, being of the same size and shape, are superimposed and oppositely oriented with the outer edges of the superimposed front legs 16a, 17a terminating flush with edge 11b of substrate 11. Thus, the side legs 16c, 17c are spaced apart at the opposite ends of the superimposed front and rear legs and lie in two planes vertically separated but adjoining.

Mounted between and filling the entire space between the two superimposed front legs 16a, 17a is a thin film non-magnetic gap spacer 18 which is approximately one micron (1micrometer) in thickness and which defines a write/read gap 18a at the tape engaging face of the transducer 14.

A suitable layer 19, 19a of thin film insulation is positioned around the superimposed rear legs 16b, 17b of the transducer 14. Mounted around the insulation 19, 19a is a multiple turn conductive coil 21 having conductive leads 22, 23 connected to its opposite ends and a center head 24 leading to connection pads 22a, 23a, 24a.

The coil 21 is formed by deposition techniques and includes a first plurality of thin film coil turn forming pieces 21a positioned between the substrate 11 and the adjacent rear leg 16b, separated therefrom by insulation layer 19a. The coil turn forming pieces 21a each have opposite ends which extend beyond the front and rear edges of the superimposed rear legs 16b, 17b. A plurality of conductive risers 21c are then deposited onto exposed portions of pieces 21a. A second plurality of thin film coil turn forming pieces 21b are deposited above the superimposed rear legs 16b, 17b, being separated therefrom by insulation 19 and onto riser 21c, thereby forming turns by the series connection of pieces 21a, 21c, and 21b. Again, the opposite ends of the pieces 21b extend beyond the front and rear edges of the rear core piece legs.

In one preferred embodiment, the leads 23 and 24 are positioned perpendicular to the superimposed front legs 16a, 17a, which are rectangular in shape. However, the plurality of bottom coil turn forming pieces 21a are parallel to each other but positioned at an angle to the opposite edges of the superimposed rear legs 16a, 17a. As best shown in FIG. 3, a small acute angle is formed between an imaginary line extending through a piece 21a and a line extending perpendicular to the superimposed front legs. The top pieces 21b are also parallel to each other but positioned at an oppositely oriented angle such that the opposite ends of each connect to the opposite ends of adjoining ones of the pieces 21a to form the coil. The number of turns extending across the rear legs 16b, 17b can easily be changed by changing the spacing and size of the coil turn forming pieces.

The method of constructing the transducer is as follows. A layer of conductive material, in this case gold, is deposited on a suitably prepared substrate surface 11a. The layer is masked using conventional photolithography and all but the bottom turns 21a and leads 22, 22a, 23, 23a, 24, 24a are etched away. A layer of insulating material, preferably aluminum oxide, is then deposited over the bottom turns 21a in the area to be covered by the core piece 16, leaving the ends of the turns 21a bare. The bottom core piece 16 is then deposited in the position shown over the insulation layer 19a and the substrate 11a. A starting layer of the material is sputtered and then the balance is electroplated. The core piece material is a magnetic material (i.e., having magnetic properties) preferably Permalloy, an alloy of 81% nickel and 19% iron. The gap spacer 18, also of aluminum oxide, is then sputtered in place over the front leg 16a as shown. The upper core piece is then sputtered and electroplated as noted for the bottom core piece. The layer of insulation 19 is then sputtered over the superimposed back legs 16b, 17b to insulate the top surface and edges thereof.

The next step is to apply a layer of polyimide, preferably Pyrolin (a DuPont Trademark), over the substrate 11 to fill the area within and around the transducers 14. The layer of polyimide, which is applied by spinning and baking, is designated by the numeral 25. The layer 25 is shown by broken lines in FIG. 1 as well as partially broken away in FIG. 2 for clarity of illustration. The layer 25 is approximately the same thickness as the transducer 14. Portions of the polyimide layer 25 over the ends of the bottom pieces 21a, the end of lead 22, and over the pads 22a, 23a, 24a are then etched away so that the resulting openings can be filled by electroplating with gold to form the risers 21c. A sputtering process is then used to deposit the gold top turns 21b. The entire unit can then be passivated and then potted if so desired, leaving the pads 22a, 23a, 24a open for connection to the drive/sense circuitry using a mass termination technique, for example.

PREFERRED EMBODIMENT

In addition to the advantages obtained by the embodiment previously described, it is possible to improve the uniformity of flux density within the gap along the track width. If the flux density is uniform along this length, the head will not be subject to saturation which generally occurs at the ends of the gap where the magnetic flux is more intense. The preferred embodiment described below involves a modification of the above-described embodiment employing two separate techniques to improve linearity. Either technique may be used independently or in conjunction with the other, which is the preferred case. The preferred embodiment also results in a transducer which is substantially immune to variations in gap field strength uniformity and intensity despite head wear which changes the dimensions of the core pieces, particularly $W_2(0)$.

The first technique involves altering the shape of the core pieces so as to compensate for the variation in the magnetic field strength which otherwise tends to occur in the track width region. The second technique modifies the gap at its ends by providing for "terminations" which in effect reduce fringe field variations across the gap.

A preferred embodiment of the thin film tape head 110 is shown in FIGS. 4 and 5. Fabrication of head 110 is accomplished in essentially the same manner as that of the embodiment shown in FIGS. 1–3. Only those portions of this embodiment which differ from the previous embodiment will be explained in detail.

Head 110 includes first and second core pieces 116 and 117 which overlay each other in the manner described in the first embodiment. The shape of these core pieces differs, however, from the previous embodiment.

Since core pieces 116 and 117 are merely mirror images of each other, only one will be described in detail. Core piece 117 is generally a rectangularly shaped structure which is not closed due to separation 150 as shown in FIG. 4. Piece 117 can be identified in terms of four separate portions 117a-d which are contiguous as shown in FIG. 4. Side portions 117a and c are generally parallel and opposing, and rear portion 117b and front portion 117d are generally opposing, and with respect to their outer edges can be considered parallel. Coil 121 is formed in a manner identical to that as explained for the first embodiment above so that it surrounds a section of portion 117b and the corresponding portion on the lower core piece 116. As in the previous embodiment insulation 119 provides electrical separation between coil 121 and core pieces 116-117.

The core pieces 116-117 are in magnetic contact which creates a magnetic circuit which is interrupted at separation gap 150 in core piece 117, separation gap 152 in core piece 116, and the gap 154. Gap 154 is intended to be in contact with the magnetic material (such as magnetic tape) to accomplish the read and write functions of head 110.

Portion 117a is not in direct physical contact with portion 117d, but rather shares a common separation 150. Portion 117a has a notched section 161 which receives edge 160 of portion 117d.

Portion 117d of piece 117 is shown in FIG. 4 as lying above a mirror image portion 116d as indicated. Portion 117d has a front edge identified by the numeral 156, a rear curved edge 158, a small side edge 160, and a longer side dimension 162 as measured from edge 156 to the end of the curved edge 158 as indicated in the drawing. Curved portion 158 and its mirror image 158a on portion 116d intersect at point 164 which is the midpoint in the track width 166 (which runs from point X=0 to X=L as indicated). Edge 158 can be generally defined as a line extending from edge 160 to dimension 162 so that portion 117 gradually increases in surface area as shown. Edge 158 can be approximated as an S-shaped bend or, in more mathematical terms, curve 158 follows the form as defined by the following equation:

$$W_2(x) = W_2(0)(e^{2x/L})$$

where $W_2(0)$=the minimum width of portion 117d measured from edge 156 and L=the track width 166. This equation defines the portion of curve 158 denoted as 158′ from x=0 as indicated to point 164 midway across the track width 166. Point 164 is defined as L/2. The remaining portion denoted 158″ of the curve from L/2 at point 164 to the end of the curved portion 158 at "x=L", will be described hereinafter.

On the lower core piece 116, namely portion 116d, the curve from x=0 to point 164 is defined by the formula:

$$W_1(x) = W_2(0)(2e - e^{2x/L})$$

where $W_1(0)$ is the distance from edge 156 to the beginning of curve 158a closest to coil 121. L is equal to the track width 166, e is the base of the natural logarithm, and x is a variable indicating points along the x dimension. This formula applies for the portion of the curve denoted 158′ from x=0 to x=L/2 (at the point 164). The remaining portion of the curve, namely 158a″, extending from point 164 to "x=L", is the mirror image of portion 158′ previously described. The remaining portion of curve 158a, namely 158a″, is the mirror image of portion 158′ as described above.

In order to provide a more uniform flux density across the entire length of track width 166, it is desirable to provide termination at the end of the track width at x=0 and x=L. The termination provides a greater flux density beyond the ends of the track width which simulates a core piece of infinite length. To achieve this result, one can determine the Reluctance in the reduced gap 155 as equal to:

$$R = \frac{2g}{W_2(0)L}$$

where L is again track width 166 and g is the width of gap 154. $W_2(0)$ is shown in FIG. 4.

With the Reluctance known from the parameters of the particular design, a termination Reluctance can be computed by substituting desired dimensions for g′ and L′ conforming the termination to meet those requirements according to the formula:

$$R = \frac{2g}{W_2(0)L} = \frac{g'}{W_2(0)L'}$$

which will produce the required magnetic reluctance at the gap ends (i.e., ends of the track width) for a termination of a particular area or volume.

Terminations 170 and 172 are shown in FIG. 4 and are substantially identical. FIG. 5 shows an enlarged view of termination 172. In the preferred embodiment, the termination includes a portion of core piece 117 which extends into gap 154 defining the remaining gap g′ (also indicated as 155). The length of this termination is indicated as L′. Thus it can be seen that gap 154 is reduced at the termination to a new gap dimension indicated as 155. As gap 155 is shown as thinner than 154, it could be appreciated that the field intensity in termination 172 is somewhat greater than through track width 166. The result is that within gap 154, there is a uniform field strength in the track width region independent of x. To produce this effect would otherwise require an infinite track width.

Terminations 170-172 are formed as part of portion 117d (although portion 116d would be equally suitable) and have a volume of $(g-g') \times L' \times W_2(0)$.

It can be appreciated that the dimensions g′ and L′ can be varied to suit the designer's requirement by using the reluctance formula indicated above so as to produce a reluctance which simulates an infinite track width of uniform flux density. Terminations 170-172 may, for example, be chosen such that L′=(1/10)L track length (166) and g′=1/5 g.

It can also be appreciated that if the present invention is constructed of discrete materials, rather than through a deposition process, and gap spacer 18 is eliminated, a uniform field intensity is obtained which may be usable in other applications such as providing a bias field for magnetic bubble memory systems.

What is claimed is:

1. A thin film magnetic transducer comprising:
   (a) a non-magnetic substrate;
   (b) first and second superimposed core planar pieces adjacent said substrate, each being mirror images of each other and each comprising a magnetic thin film having spaced front and rear portions, first and second side portions, said front and rear portions being magnetically coupled to said first side portion, said front portion having front and rear edges which extend from said first side portion toward said second side portion, but discontinuous with said second side portion, a first width defined as the distance between front and rear edges on said front portion of first core piece, a second width defined as the distance between front and rear edges on said front portion of second core piece, a track width of the transducer defined generally as the distance along the front edge from the discontinuity in the first core piece to the discontinuity in the second core piece;

(c) a thin film non-magnetic gap spacer between said superimposed front portions and bounded by said discontinuities to form a transducer gap therebetween;

(d) a conductive coil having multiple turns positioned around said rear portions of said core pieces comprising a first plurality of spaced thin film coil turn forming pieces disposed on said substrate and residing between said substrate and one of said core pieces, a plurality of riser portions extending upwardly from the ends of said first coil forming pieces, a plurality of second thin film coil turn forming pieces on the other of said core pieces and connected to the remaining ends of of said risers to form a continuous coil;

(e) layers of thin film insulation disposed between said coil and said core pieces; and (f) means for establishing a uniform flux within said transducer gap including providing an increasing first width across said front edge on said first core piece while providing a decreasing second width.

2. A core for use in a magnetic transducer comprising a magnetic material having first and second front and rear planar legs and first and second side planar legs, said first side leg joining side first front and rear leg at one side thereof and said second side leg joining said second front and rear legs at the other side thereof thereby forming first and second core pieces with each core piece being discontinuous, said first and second front legs being disposed in separate parallel planes defining a transducer gap therebetween, said front legs each having a front edge and a rear edge extending between said side legs defining first and second front widths between said front and rear edges thereof, and means for establishing a uniform flux density within said gap including increasing said first width across said first front leg along an axis extending from said first side leg to said second side leg while decreasing said second width in the same direction across said second front leg along said axis.

3. A core according to claim 2 including portions of magnetic material extending into said transducer gap toward opposite ends thereof, said portions being of predetermined volume.

4. The thin film magnetic transducer of claims 1 or 2, wherein the first plurality of coil turn forming pieces are parallel to each other, and wherein the second plurality of coil forming pieces are parallel to each other and positioned such that the opposite ends of each connect to opposite ends of adjoining ones of the first plurality to form said coil.

5. The thin film magnetic transducer of claims 1 or 2, wherein the coil turn forming pieces are generally planar and wherein the ends are connected by conductive risers.

6. The thin film magnetic transducer of claims 1 or 2, wherein said increasing and decreasing widths are mirror images of each other and said rear edges of said front portions intersect each other at a midpoint generally midway between said first and second side portions.

7. The thin film magnetic transducer of claim 6 wherein said increasing and decreasing widths define a generally "S" shaped curvature in said rear edges and wherein said curvatures of said first and second rear edges are substantially mirror images of each other.

8. The thin film magnetic transducer of claims 1 or 2, wherein said first width increases from a starting point located generally where said first side portion and said front portion are adjacent to said midpoint substantially according to the formula:

$$W_2(x) = W_2(0) \cdot (e^{2x/L})$$

wherein $W_2(0)$ is the minimum dimension of said first width, L is the length of the front edge defining a track width, and wherein $W_2(x)$ is said first front portion width at a point x along said front edge;

and wherein said second width decreases from said starting point to said midpoint across said front edge substantially according to the formula:

$$W_1(x) = W_2(0) \cdot (2e - e^{2x/L})$$

wherein $W_2(0)$ is defined as above and $W_1(x)$ is said second width at a point x;

and wherein the remaining portion of said first width from said midpoint to the intersection of said second side portion and said front portion is defined as the mirror image of $W_1(x)$;

and wherein the remaining portion of said second width from said midpoint to the other end of said front edge is defined as the mirror image of $W_2(x)$.

9. The thin film magnetic transducer of claims 1 or 2, wherein said front portions of said first and second core pieces each include front coplanar faces having parallel inner opposing edges defining said transducer gap therebetween;

said gap having ends defining the track width of the transducer;

means of predetermined volume located at said gap ends for establishing a constant area of flux density through said track width.

10. The thin film magnetic transducer of claim 3 wherein said volume is determined by producing the required magnetic reluctance at said gap ends wherein said reluctance is defined by the formula:

$$R = \frac{g'}{W_2(0)L'} - \frac{2g}{W_2(0)L}$$

wherein g' is the distance from said termination portion on one of said core pieces to the remaining adjacent core piece, L' is the length of said termination portion, $W_2(0)$ is the minimum width of said front portion, g is the dimension of said gap and L is the track width.

11. The thin film magnetic transducer of claim 9 wherein said volume is determined by producing the required magnetic reluctance at said gap ends wherein said reluctance is defined by the formula:

$$R = \frac{g'}{W_2(0)L'} \quad \frac{2g}{W_2(0)L}$$

wherein g' is the distance from said termination portion on one of said core pieces to the remaining adjacent core piece, L' is the length of said termination portion, $W_2(0)$ is the minimum width of said front portion, g is the dimension of said gap and L is the track width.

* * * * *

UNITED STATES PATENT AND TRADEMARK OFFICE
CERTIFICATE OF CORRECTION

PATENT NO. : 4,357,640

DATED : 2 November 1982

INVENTOR(S) : John E. Heinz and M. Grant Albrecht

It is certified that error appears in the above—identified patent and that said Letters Patent is hereby corrected as shown below:

Column 1, line 59, "it it" should be --it is--;

Column 1, line 64, "effect" should be --affect--;

Column 4, line 8, "Permalloy" should be --Permalloy$^{TM}$--;

Column 7, line 29, delete "of"

Column 7, line 40, "joining side first" should be --joining said first--.

Signed and Sealed this

Twelfth Day of April 1983

[SEAL]

Attest:

Attesting Officer

GERALD J. MOSSINGHOFF

Commissioner of Patents and Trademarks